United States Patent [19]

Pipon et al.

[11] Patent Number: 4,743,067
[45] Date of Patent: May 10, 1988

[54] RAPID LOCKING DEVICE FOR AN ARTICULATED SEAT

[75] Inventors: Yves Pipon; Georges Droulon, both of Flers, France

[73] Assignee: A. & M. Cousin & Cie, Flers, France

[21] Appl. No.: 61,031

[22] Filed: Jun. 11, 1987

Related U.S. Application Data

[63] Continuation of Ser. No. 743,071, Jun. 10, 1985, Pat. No. 4,690,458.

[30] Foreign Application Priority Data

Jun. 15, 1984 [FR] France ................................ 84 09418
May 22, 1985 [FR] France ................................ 85 07699

[51] Int. Cl.⁴ ............................................. B60N 1/02
[52] U.S. Cl. ..................................... 297/379; 297/216
[58] Field of Search ........................ 297/378, 379, 216; 16/337, 341, 342

[56] References Cited

U.S. PATENT DOCUMENTS

| 3,216,766 | 11/1965 | Tabor | 297/379 X |
| 3,517,965 | 6/1970 | Cowles | 297/379 X |
| 3,523,593 | 8/1970 | Karasick | 297/374 X |
| 4,103,967 | 8/1978 | Tanaka et al. | 297/379 X |
| 4,429,919 | 2/1984 | Klueting et al. | 297/379 |

FOREIGN PATENT DOCUMENTS

| 2708461 | 8/1978 | Fed. Rep. of Germany | 297/379 |
| 2350982 | 5/1976 | France | 297/374 |
| 468922 | 7/1937 | United Kingdom | 16/342 |
| 1011446 | 12/1965 | United Kingdom | 297/374 |

Primary Examiner—Kenneth J. Dorner
Assistant Examiner—Peter R. Brown
Attorney, Agent, or Firm—Browdy & Neimark

[57] ABSTRACT

A rapid locking device for an articulated seat including an outer casing having a central spindle connected to one side of a seat-back frame, the outer casing containing a second casing which is star-shaped and carries a swing bar on which are mounted idle serrated rollers placed between outer face of the star-shaped casing and inner face of the outer casing.

2 Claims, 5 Drawing Sheets

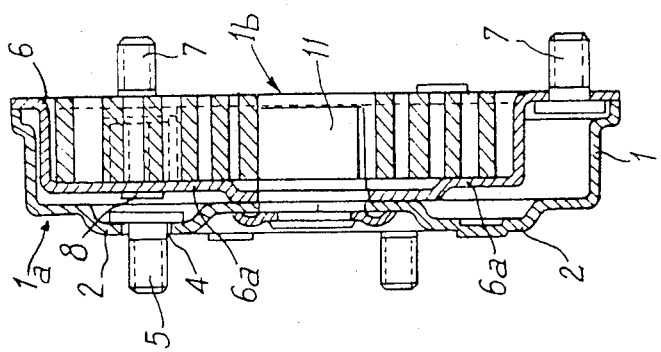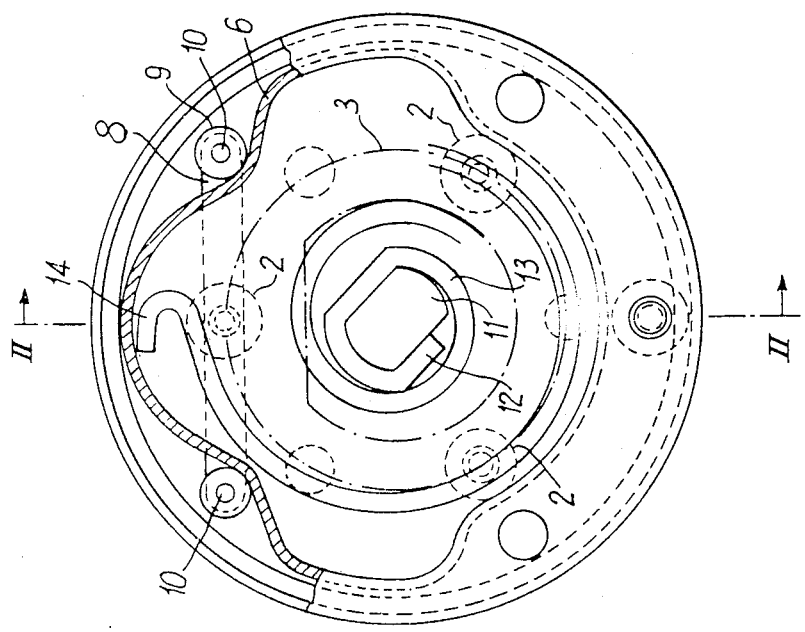

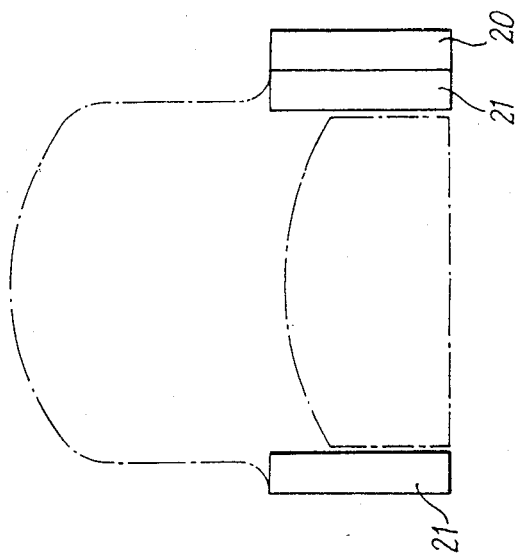
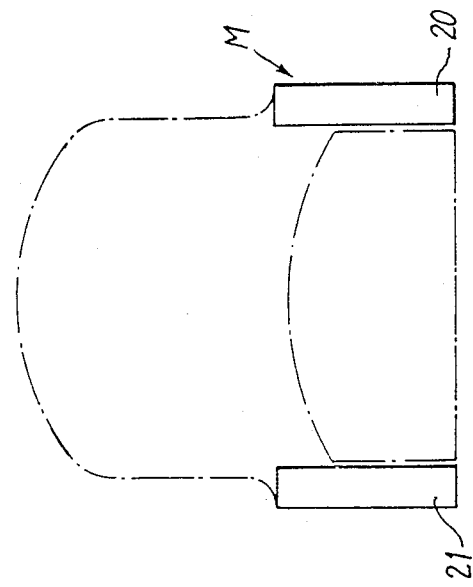

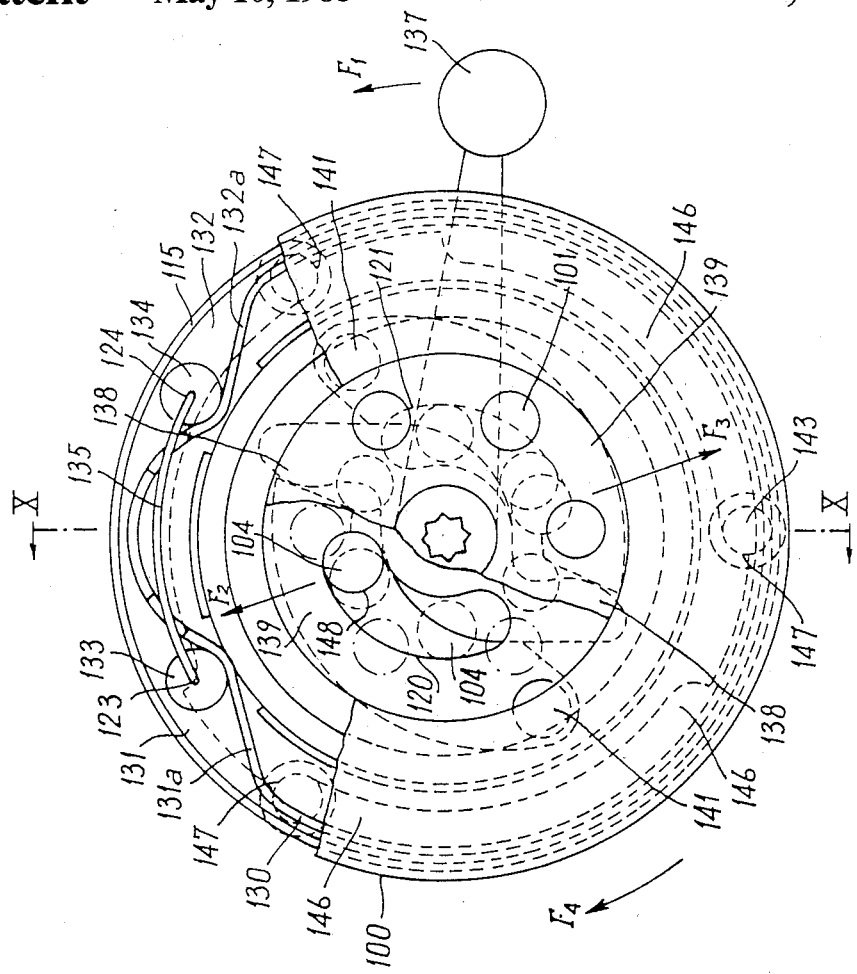
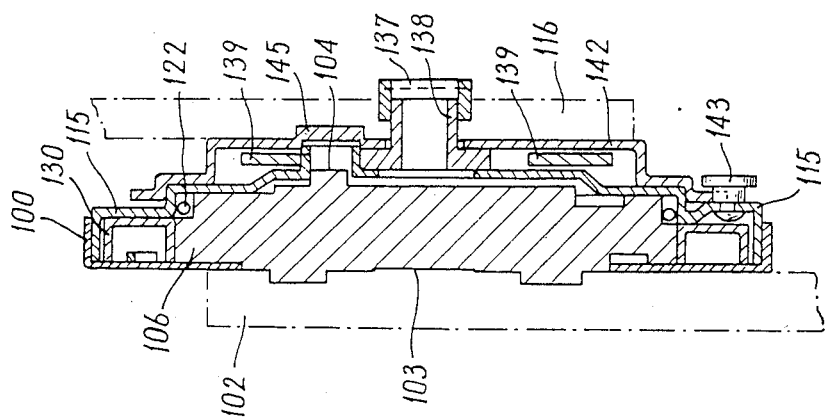

RAPID LOCKING DEVICE FOR AN ARTICULATED SEAT

This is a continuation, of application Ser. No. 743,071 filed June 10, 1985, now U.S. Pat. No. 4,690,458.

FIELD OF THE INVENTION

The invention relates to a rapid locking device for an articulated seat.

BACKGROUND OF THE INVENTION

For setting the inclination of the backs of vehicle seats, and particularly of motor vehicles seats, fitting devices are used which allow setting the inclination either discontinuously or continuously. However, for economy's sake, the device is generally mounted on a single side of the seat, and on its other side the back is mounted on a mere spindle.

Moreover, when discontinuous devices are used, a return spring biasing the seat-back against the user's back has to be provided between the seating portion and the back portion of the seat.

All these known fitting assemblies are on the one hand complex and on the other hand difficult to set in place on the seats, making adaptations necessary for each type of seat, thereby making the products costly and moreover cumbersome and unsightly.

The present invention aims to remedy all these difficulties by providing a rapid locking device replacing the fitting of the articulations, and made in such a manner that the majority of the parts can be used in all cases, whatever the type of articulations used, the type of the seats or the type of the vehicles. Therefore the locking device is very economical, particularly since it is almost universal, by incorporating even the return spring of the seat-back when a discontinuous fitting is used for the setting of the inclination of the seat-back.

Likewise and if necessary, it is also possible to use a gear reducer motor unit controlling a displacement of the fitting which sets the inclination of the seat-back by using also the locking device according to the present invention.

SUMMARY OF THE INVENTION

According to the invention, the rapid locking device of an articulation mounted on the frame of a seat-back as a complement of the positioning articulation or actuating fitting, is composed of an outer casing having in its center a central spindle connected by various means to one of the sides of the seat-back frame, this outer casing containing a second casing in which can be included a seat-back return spring since one of the ends of this spring is fixed on the central rotation spindle and the other end of this spring engages by means of a U-shaped portion, the side inner face of the casing. The second casing is star-shaped and delimits, with the outer casing, a housing for at least one a swing bar at the ends of which are mounted idler rollers having a serrated outer surface, the rollers being placed between the outer face of the star-shaped casing and the inner face of the outer casing. The rollers are, when there is an impact, driven by inertia, due to their own weight and also to the rotation of the outer casing under the pivoting action of a outer casing with respect to the star-shaped casing which is rigidly connected to the seating portion of by penetration of the locking idle rollers between the two aforementioned casings.

According to another feature of the invention, the device comprises an outer dish rigidly connected to the seat-back frame by an outer casing in which is placed a shaped casing, said outer casing and shaped casing delimiting together a housing containing an inertia locking member comprising two rollers with a serrated outer surface and connected by a maintaining member; the outer casing is rigidly connected to the seat-back frame, can rotate under the action of an inclination setting fitting and is also provided, when there is a rapid tilting motion of the seat-back to the front, with two arch-shaped diametrically opposite slots in which move protrusions rigidly connected to the articulation fitting, and, when there is no rapid tilting motion of the seat-back to the front, the hereabove arch-shaped slots are replaced by holes in which positioning fingers extending from the articulation fitting will engage centrally.

According to still another feature of the invention, the device further comprises a rocker bar rigidly connected to a double cam bearing on two locking elements acting on the protrusions.

Various other features of the invention will become more apparent from the following detailed description.

BRIEF DESCRIPTION OF THE DRAWINGS

Embodiments of the invention are shown, by way of non limiting examples, in the accompanying drawings, wherein:

FIG. 1 is a side elevation view, partly in cross-section, of a rapid locking device;

FIG. 2 is a diametral cross-sectional view substantially along line II—II of FIG. 1;

FIG. 3 is an assembly plan;

FIG. 4 is an alternative of the assembly plan of FIG. 3;

FIG. 9 is a front elevation view, partly in cross-section, of a rapid locking device of a seat articulated so as to pivot rapidly to the front, with a rapid safety unlocking arrangement allowing a tilting of the seat-back when the rollers are jammed between the dish and the casing;

FIG. 10 is a sectional view along line X—X of FIG. 9.

DESCRIPTION OF THE PREFERRED EMBODIMENTS

Figure 5:
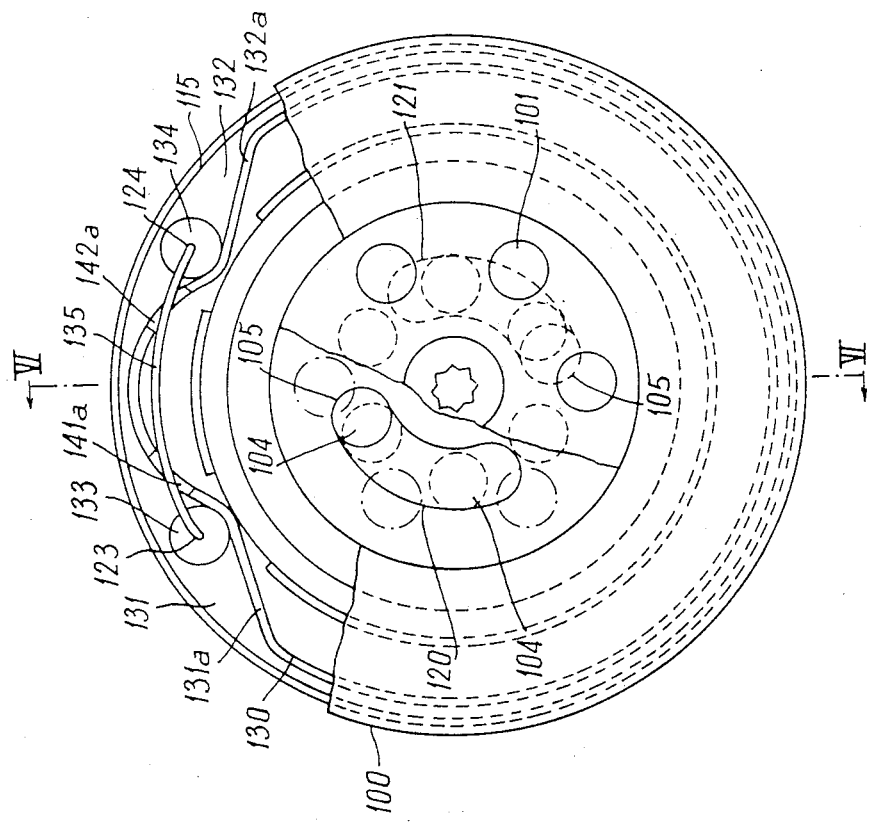
FIG. 5 is a front elevation view, partly in cross-section, of a rapid locking device of a seat articulated so as to pivot rapidly to the front.

In FIG. 1, the device is formed mainly of an outer cylindrical casing 1 the bottom 1a of which is conformed so as to provide cup-shaped dishes 2 arranged on an imaginary circle 3.

The outer casing 1 is connected, by means of bolts 5 extending through holes 4 formed in the cup-shaped dishes 2, to the seat-back frame (not shown). In the present case, the bolts and since the cup-shaped dishes are three number, 5 are off-set by 120° with respect to each other but they could also, for example, be off-set by 90°.

A star-shaped second casing 6 is placed inside the casing 1 and is connected via bolts 7 to the frame of the sitting portion (not shown). The number of bolts 7 is three in the present case, the bolts 7 being off-set by 120°.

Moreover, in the casing 6 there is placed a swinging bar 8 which receives at its free ends, on spindles 10, idle rollers 8 having serrated edges. The device is closed, at the side 1b of the casing 1, in general, by the frame of the seating portion of the seat.

Finally, a central spindle 11 is rigidly connected to the rotating outer casing 1 and is used as a fixation point for the end 12 of a spring 13 the other end 14 of which is in contact with the peripheral inner portion of the star-shaped casing 6.

The central spindle 11 is used as a rotation axis for the back of the seat since the central spindle 11 is rigidly connected to the rotating casing 1 retained on the base of the seat-back frame by the bolts 5.

When a discontinuous fitting is used on the other side of the seat, the spring 13 applies, due to its initial tension, a pressure against the back of the user since the spring 13 has a tendency to bias the seat-back against the user's back.

Thus, when the discontinuous fitting is badly locked or when there is a brutal impact on the vehicle at the moment when the discontinuous fitting is free for some reason, it is easy to understand that the mass of the idle rollers 9 causes the rollers 9 to go on moving on their path of travel, whereas the star-shaped casing 6, which is rigidly connected to the seating portion and therefore to the car body, is stopped in space. The rollers 9 will then penetrate into the outer wall of the star-shaped casing 6, and the metal sheets of the casings 1 and 6 are deformed, and even sometimes torn, thereby providing an absorption of energy protecting the passengers from suffering too heavy traumatisms.

As hereabove discussed, in the case of continuous articulations, i.e. of articulations constantly in engagement even during a setting steps, the spring 13 is not necessary and can therefore be omitted, which makes the whole assembly lighter.

As shown in FIG. 3, there is normally only a single actuating fitting 20 (continuous or discontinuous) and a single rapid locking device 21 of the type described in FIGS. 1 and 2. It is however possible, as shown in FIG. 4, to place on the side of the actuating fitting 20, which then discontinuous, a rapid locking device 21 possibly comprising a spring 13. This affords a total security on both sides of the seat, even when there is an impact during the setting steps.

There is thus provided an absolute security since, whatever the type of actuating fitting, the seat-back is always locked when an impact appears. However, moreover the device of the invention makes unnecessary to increase the thickness of the metal sheets used for manufacturing the fitting and to position a connecting bar at bottom of the seat-back, the object of which was to increase the torsional strength on the upright opposite the articulation. There is thus obtained an articulation assembly of a reduced weight, which is very advantageous mainly in modern vehicles the design of which is to avoid at any cost an unnecessary dead weight.

In some cases, the safety device is directly adaptable on the seating portion of a seat provided with a raising articulation.

For a better understanding of another feature of the invention, FIGS. 5–10 diagrammatically show a seat frame comprising the seating portion 102 and the back 116, as well as the tilting and positioning mechanism 103 (articulation setting fitting) for a seat-back which can be of a continuous or discontinuous principle and with a manual or motorized control as needed.

In FIGS. 5–10, the rapid locking device comprises a dish shaped member 100 rigidly connected by welding to an outer casing 115 serrated idle rollers 133, 134 similar to the idle rollers of FIGS. 1 and 2 between vertical inner walls of the outer wall of s shaped casing 30 which is connected such as by welding, to the outer portion 106 of the positioning device 103 which is used.

Figure 7:
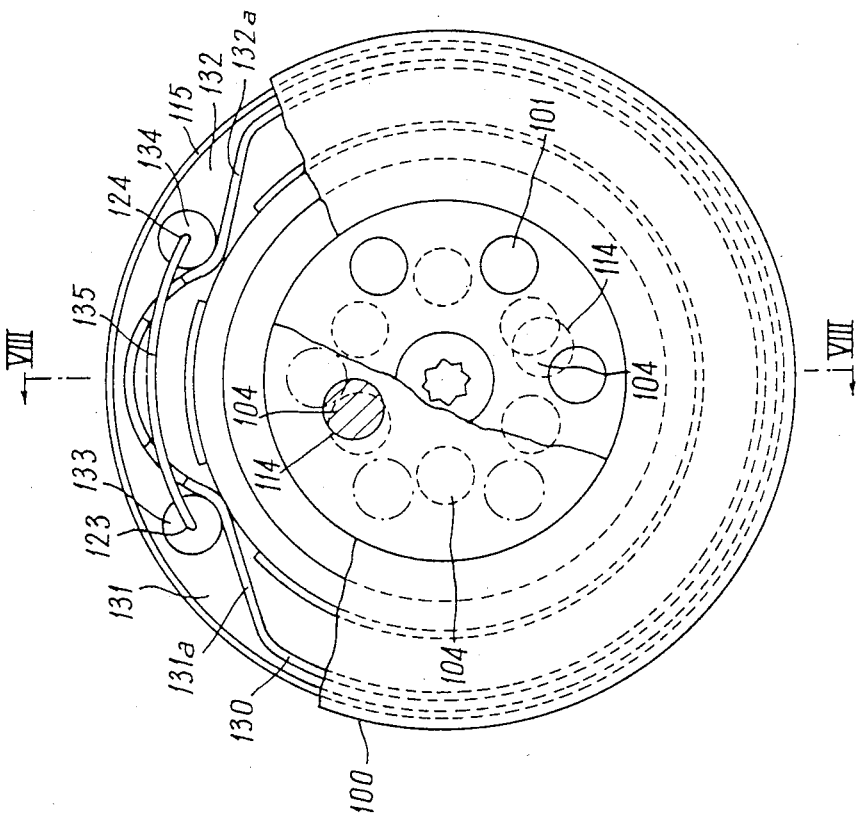
FIG. 7 is a front elevation view, partly in cross-section, of a rapid locking device of a seat articulated without a rapid pivoting motion to the front.

The serrated idle rollers 133, 134 are maintained in the intersections of the two ramps 131a, 141a and 132a, 142a by a hoop 135 with turned over ends engaged into holes 123 and 124 provided in the serrated idle rollers 133, 134. 133, 134 are not in engagement with the casing 115 (see FIGS. 5, 7 and 9).

In order to provide a passage for the users of the rear seats of a two-door vehicle, it is necessary that the seat-back is mounted so as to be tiltable towards the front, but the seat-back must also be locked towards the front when the vehicle is subjected to a frontal impact. The device shown in FIGS. 5 and 6 fulfills these positioning functions by means of a mechanism 103 coming into engagement by protrusions 104 always in the rear position in the same place on abutments 105 in bottom of arched windows 120, 121 formed in the casing 115. When the vehicle is subjected to an impact, the serrated idle rollers 133, 134 move upwardly on the ramps 141a, 132a, or 131a 142a by inertia, and then jamm themselves on the outer side of the casing 130, thereby any the rotation of the casing 115 and of the seat-back 116 rigidly connected thereto.

If the impact is very violent, deformation of the casing 130 and of the ramps 131a, 141a, 132a, 142a by means of the rollers 133, 134 provides an absorption of energy.

The frontwardly angular motion of the seat-back is facilitated by a series of balls 122 disposed peripherically on a closing casing of the positioning device and coming against the inside of the casing 115.

The hereabove arrangement provides also, by a cooperation of the protrusions 104 and the arched windows 120, 121, a memory position allowing the seat-back, after having pivoted on the seating portion, to resume its positions of origin.

Figure 6:
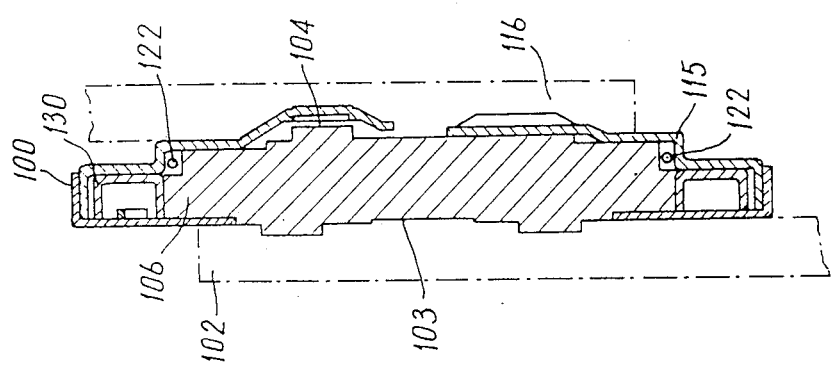
FIG. 6 is a sectional view along line VI—VI of FIG. 5.
Figure 8:
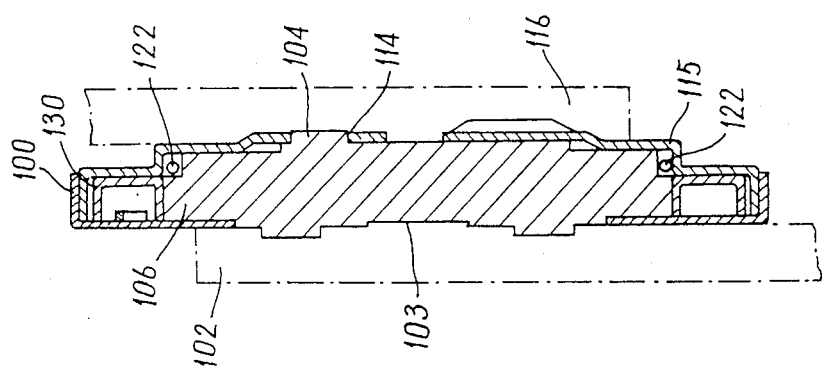
FIG. 8 is a sectional view along line VIII—VIII of FIG. 7.

FIGS. 7 and 8 relate to the same locking device as in FIGS. 5 and 6, but in this device, a tilting motion is not considered since the assembly is used in a four-door vehicle. In this embodiment, the rapid locking mechanism should come in action when, during a positioning or tilting operation of the seat-back, the vehicle is subjected to an untimely impact produced on the front or back of the vehicle. The arched windows (120 and 121 in FIGS. 5 and 6), which were necessary for a pivoting motion of the seat-back, are therefore omitted and replaced by mere holes 114 in which extend positioning fingers 104 extending from the mobile flange of the articulation 103 into consideration.

FIGS. 9 and 10 still relate to the same inertia locking device that of FIGS. 5 and 6 and is used on a seat-back tilting device for a two-door vehicle, but the pecularity of which is to enable a safety tilting motion when after an impact the idle rollers 133 and 134 lock together the casings 115 and 130 by being jammed therebetween.

Actually and as already indicated with reference to FIGS. 5 and 6, idle rollers 133, 134 can, after a violent impact, and by absorbing the energy, deform the shaper outer casing 115 as well as the assembly of the ramps of the shaping casing 130. Then, it can happen that the passengers using the rear seat of the two-door vehicle cannot push the seat-back further to the front. A complementary safety device added to the assembly already described with reference to FIGS. 5 and 6 allows unlocking the assembly and quickly pivoting the seat-back to the front. As shown in FIGS. 9 and 10, an action exerted in the direction of arrow $F_1$ on a rocker bar 137 rigidly connected to a double cam 138 biases two locking elements 139 which are in reaction on the protrusions 108 extending from the casing 115. The two locking elements 139 pivot about their axis 141 in the direction of arrows $F_2$, $F_3$ and free the protrusions 104. Flange 142 which is rigidly connected to the seat-back 116 can then pivot to the front and clear the passage for the passengers occupying the vehicle rear seats.

Fixation points 145 shown by semi-cuttings can be provided by any convenient means (bolts, screws, weldings) for connecting the rapid pivoting flange 142 to the seat-back 116. Several studs 143 maintain the casing 115 on the flange 142. Recess portions 146 provide for the motion range of the seat-back. Contact points 147 limit the clearance between the holding points provided on the locking elements 139.

Rotation of the seat-back 116 is obtained in the direction of arrow $F_4$ in case of a normal utilization before an impact in the front, as well as after such an impact, by an unlocking of the locking elements 139.

We claim:

1. Rapid locking device for an articulation mounted on a frame of a seat-back as a complement of a positioning articulation fitting, comprising an outer casing (1) having in its center a central spindle (11) connected to one side of the seat-back frame, said outer casing (1) containing a second casing (6), said second casing having a circumference including a plurality of outwardly extending projections (6) being star-shaped and delimiting with said outer casing (1) a housing for at least one swing bar (8) having ends on which are mounted idle rollers (9) with a serrated outer surface, said idle rollers (9) being placed between an outer face of the star-shaped casing (6) and an inner face of the outer casing (1), whereby said idle rollers (9) are, upon an impact, moved by inertia due to their own weight and also to rotation of the outer casing (1) under a pivoting action of the seat-back, which locks the outer casing (1) with respect to the second casing (6) by penetration of the idle rollers (9) inbetween the second casing (6) and the outer casing (1), said second casing (6) being rigidly connected to the seating portion of the seat.

2. The device according to claim 1, further comprising a seat-back return spring (14), with one of the ends of said spring (14) being fixed on said central spindle (11) and another end of said spring comprising a U-shaped portion engaging an inner face of the second casing (6), wherein said spring biases said seat-back against the back of the user.

* * * * *